3,851,053
BIOCIDAL ELASTOMERIC COMPOSITION AND METHOD FOR DISPERSING BIOCIDES THEREWITH
Nathan F. Cardarelli, Copley, Ohio, assignor to The B. F. Goodrich Company, New York, N.Y.
No Drawing. Filed Nov. 1, 1971, Ser. No. 194,528
Int. Cl. A01n 9/00
U.S. Cl. 424—78                                    1 Claim

ABSTRACT OF THE DISCLOSURE

Many toxicant chemicals which exhibit biocidal action are soluble to some extent in solid elastomers. When it is desired to make a biocidal composition comprising a solid elastomer plus a greater amount of toxicant chemical than is soluble in the given amount of elastomer, this can now be done in an improved manner by employing microballoons to hold the extra toxicant chemical. The microballoons carrying the extra toxicant are apparently physically bound in the molecular chains of the solid elastomer.

CROSS-REFERENCE TO RELATED APPLICATIONS

Ser. No. 741,223, filed June 28, 1968, now U.S. Pat. 3,639,583.
Ser. No. 837,908, filed June 30, 1969, now abandoned.

BACKGROUND OF THE INVENTION

Vulcanizable organic elastomer compositions have been discovered comprising an organic elastomer, an organic toxicant for biocidal use dissolved therein, and selected proportions of compounding ingredients including carbon black, wax, fillers and the like. These compositions further comprise a vulcanized elastomeric matrix containing a vulcanizable organic elastomer, from about 0.02 to 20 parts by weight per 100 parts by weight of said elastomer in said matrix of an organic toxicant dissolved in said matrix and from 5 to 100 parts by weight of a carbon black per 100 parts by weight of said elastomer in said matrix, said matrix being vulcanized and the proportion of said carbon black in the range given being selected to yield a desired rate of release of said toxicant by said composition to its environment. Vulcanizable organic elastomers employed include natural rubber, neoprene, nitrile rubbers, butyl rubber, SBR, polybutadiene and the like. The term "vulcanizable organic elastomer" means any vulcanizable elastomer or rubbery material which has a structural back bone consisting of carbon-to-carbon chains, although such structure may contain non-hydrocarbon substituents (i.e. halogen and nitrile groups) or pendant groups (as contrasted with a silicone rubber having a back bone of —O—Si—O— repeating units); and which is vulcanizable from the thermoplastic to the elastic condition.

By "vulcanizable from the thermoplastic to the elastic condition" is meant an ability of the elastomer to be converted from a thermoplastic to an essentially elastic condition by any of the many mechanisms including, but not limited to, sulfur-vulcanization, metal oxide curing systems, peroxide curing systems, amine curing systems, and curing through metallo-carboxylate linkages.

By the term "organic toxicant" is meant a toxicant compound carrying in its chemical structure a sufficient number of chemically bound organic groups to render the compound soluble to the extent of from about 0.02% to about 20% by weight in the vulcanizable organic elastomer. Preferred toxicants have, in addition, low volatility in air and low solubility in natural waters. The toxicant should have a boiling point above 150° C., more preferably it should boil at 200° C. or higher. Solubility of the toxicant in water is preferably less than 50 p.p.m. The exact nature of the toxicant having these properties is then not critical since the choice of a particular toxicant having said properties will be dictated primarily by its known effectiveness against the target pest to be killed, controlled or repelled.

Organic toxicants sufficiently soluble in such elastomeric compositions for biocidal use over long periods of time include organotin compounds of the formula

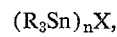

nitrosalicylanilide compounds and their salts, chlorinated hydrocarbons compounds, organo - phosphorous compounds and the like. In the formula $(R_3Sn)_nX$, $n$ is a number from 1 to 3 (intermediate number indicate mixtures), R is an alkyl group containing 1–20 carbon atoms or an aryl group containing 6–18 carbon atoms, and X is a substituent radical attached to the metal atom selected from the class consisting of sulfide, oxide, chloride, bromide, fluoride, chromate, sulfate, nitrate, hydroxide, fatty acid groups such as acetate, octanoate, laurate, dimethyl dithiocarbamate, naphthenate, paravinyl benzoate, acrylate, methacrylate, hydride or methoxide. Preferred R groups are alkyl groups containing 3 to 8 carbon atoms. The butyl group appears to maximize toxicity of the tin compounds. Preferred X radicals are oxide, sulfide, chloride, bromide and fluoride. Particularly effective is bis(tri-n-butyl tin) oxide (TBTO). Other effective toxicants are bis(tri-n-butyl tin) sulfide and bis(tri-n-butyl tin) fluoride. The preferred nitrosalicylanilide compounds and their derivatives are described in United States Pats. 3,079,297, 3,113,067 and 3,238,098. These materials have the formula

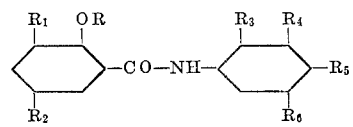

wherein R is hydrogen or lower alkanoyl radical having 1 to 4 carbon atoms, $R_1$ is hydrogen or methyl, $R_2$ is halogen (chlorine, bromine or fluorine), $R_3$ and $R_4$ are hydrogen, methyl, halogen or a nitro group, $R_5$ and $R_6$ are hydrogen, halogen or a nitro group and wherein the compound always contains only one nitro group and at most three halogen substituents. A favored toxicant of this class is known commercially as Bayluscide (trademark, Farbenfabriken Bayer). It is said to be the 2-aminoethanal salt of 5,2'-dichloro - 4' - nitrosalicylanilide. Other toxicants of this class include 5-nitro-4'-chloro-salicylanilide, 5,3',5-trichloro - 2' - nitrosalicyl-anilide, and 5,2'-dichloro-5'-trifluoromethylsalicylanilide.

Organo phosphorous compounds which may be used are represented by (O,O-dimethyl phosphorothioate of diethyl mercaptosuccinate, O,O-diethyl-3,5,6-trichloro - 2 - pyridal phosphorothioate, and p-phenylene phosphorothioate.

Representative toxicants of the chlorinated hydrocarbon class include octachloro-4,7, methano-tetrahydroindane, heptachloro-4,7, methano-tetrahydroindane, and hexachlorocyclohexane.

By the term "biocidal" is meant primarily the killing, controlling or repelling of a target pest. It is speculated that the organic toxicant is dissolved in the solid elastomeric matrix, yet remains mobile in said matrix, and diffuses to the surface of said matrix at a controlled rate and is released from the surface of said matrix into the envirOnment of said matrix by molecular release at a rate deliberately adopted to best carry out the biocidal application. The toxicants employed in these compositions are presently known materials which accomplish a given biocidal activity such as killing snails, repelling barnacles and the like. The purpose and effect of the solid elastomer is to take up and hold the toxicant in solid solution and to release it at a controlled, sustained rate (over a period up to years in duration) into the composition's environment to carry out its biocidal mission.

These controlled release rate biocidal compositions are disclosed and fully described in copending application Ser. No. 741,223, filed June 28, 1968 now U.S. Pat. 3,639,583. The method of using these compositions to kill disease-spreading, water-spawned larva, trematodes, mollusks and similar organisms is disclosed and claimed in U.S. Pat. No. 3,417,181 issued Dec. 17, 1968. The disclosure and teachings of this patent application and patent are incorpoarted herein by reference.

A major purpose of the biocidal compositions described in Pat. No. 3,639,583 is to provide slow, long term release of toxicant in a body of water to kill water-spawned and water carried disease-transmitting organisms such as larvae of mosquitoes, midges and black flies, insects, bacteria, fungi, gastropods including snail hosts of shistosome cercariae and the like. The compositions may be formulated to give slow release (over a period of years) of the toxicant used. In a given water volume they will kill or repel the undesirable elements mentioned in a matter of perhaps days, or weeks, and will then keep the water free of the said elements for a period of years. In many cases, however, the desired goal is a combination of both "quick kill" and long term continuation of a low level of toxicity to prevent a regrowth of the population of the undesirable element. The long term toxicity is provided by the compositions disclosed in Pat. 3,639,583. Quick kill, that is kill in a matter of hours, can be obtained by massive dosing of the infested water with pure toxicant. Sometimes this method is employed, but it is undersirable because toxicant chemicals, in the pure ro relatively pure forms in which they are marketed as liquids, powers or dusts, arte often dangerous to handle. The fumes or vapors may be inhaled by the user, and contact with the skin can lead to various reactions depending upon the individual. If the toxicant chemical has to be handled, it is preferable that it be handled as few times as possible between manufacture and use. It is desirable to find a way to safely and efficiently incorporated a quantity of free toxicant with the long term biocidal compositions of Pat. 3,639,583. It is desired to combine free toxicant with the solid elastomer containing dissolved toxicant so as to have the free toxicant available for quick kill when the composition is applied to a water course, area or volume, while the dissolved toxicant will be available for slow, long term release to keep the agent against which the composition is being applied in check over the long term.

The biocidal compositions of Pat. 3,639,583 are based on the fact that a number of effective biocidal materials will actually dissolve to some extent in the elastomeric matrix provided. If more than the soluble amount of biocide is present that amount remains in the free state and is merely physically associated with the elastomer containing the dissolved biocide. Any such free biocide associated with the composition is presumably available for quick kill as opposed to the dissolved biocide which is available only for long term action as it comes out of solution in the elastomer and enters the surrounding environment by the physical mechanism of solubility equilibrium. Compositions, such as the one identified as code 351B, are shown in patent application 741,233, now Pat. 3,639,583, which do contain slightly higher amounts of toxicant than are known to be soluble in the given elastomer. This particular composition is made with 12 phr. bis-(tri-n-butyl tin) oxide (TBTO) charged with 100 parts neoprene, whereas the solubility of the TBTO in this amount of neoprene is only about 9.5 parts. The undissolved 2.5 parts of TBTO is apparently available for quick kill, but the composition suffers from several drawbacks. This amount of TBTO is about the maximum that can be added to the mixture so that the total composition will still have satisfactory physical properties, tensile, strength, elongation, and so on if it is used in film or tape form. When the composition is employed in disc, pellet, or chopped form, such strength is not as important, but it is also found that the composition tends to be oily and difficult to handle in small particles because the obvious presence of the excess TBTO causes undesirable agglomeration of the particles. Storage of such material for any length of time results in the formation of a single, "soupy" mass.

SUMMARY OF THE INVENTION

The invention provides biocidal compositions which develop both quick kill biocidal action and sustained long term biocidal action by independent mechanism. It further provides biocidal compositions which incorporate excess toxicant over the amounts prior art compositions can dissolve and contain while still maintaining physical integrity of the said composition.

The invention provides that excess toxicant above the amount soluble in the given elastomer mass can be incorporated in said total elastomer mass by adding a material to the mix which is in the form of minute hollow spheres which may be permeable to the given toxicant and which apparently have great power to adsorb or otherwise hold quantities of toxicant. These minute hollow spheres are available on the market and are known as "microballoons" and "microspheres." One type of microballoon which is particularly favored is made from phenol/formaldehyde resin. The microballoons have a maximum bulk density of 0.105 g./cc. and a maximum liquid displacement density of .25 g./cc. These microballoons are available from Union Carbide Corporation under the designation BJO–0930.

Microballoons can also be made from other phenolic resins. In place of phenol one may use substituted phenols such as cresol and xylenol, diatomic phenols such as catechol and resorcinol and triatomic phenols such as pyrogallol. Other available aldehydes include acetaldehyde and furfural. Other useful resin compositions for the microballoons are methylol-amine resins which upon curing form polyamido resins. Examples of such prepolymer methylol-amine resins are: monomethylol and dimethylol urea; alkyl methylol ureas, for example N-ethyl-N′-methylol urea, N-butyl-N′-methylol ureas, alkylated methylol urea obtained by acid condensation of an alkanol with methylol urea such as butylated or isopropylated methylol urea; mono-methylol and di-methylol ethylene ureas; mono-, di- and trimethylol melaamines; methylol guanamine and methylol diguanamines. Of this group the preferred materials are the methylol-melaamine resins. Such resins are commercially available or can be prepared in the following manner: Melaamine is added to formaldehyde at a mol ratio of about ⅓ to 1/10th (melaamine/formaldehyde) and any excess or unreacted formaldehyde is distilled off. The crude resin is a syrupy liquid which is dried to a solid at ambient or slightly elevated temperatures (about 50° to 200° F.) and the solid thereafter crushed and screened to produce the desired powder.

Another permeable type of microballoon is known as "Carbo-Spheres," hollow, thin-walled spheres of carbon, provided by General Technologies Corporation. These spheres have an average particle size of 40 microns, a wall thickness of 1–2 microns of bulk density of about 0.135 g./cc. Resinous microspheres of vinylidene chloride, methylmethacrylate and styrene/acrylonitrile copolymer, all with a particle size of 30–60 microns have also been used. In addition to these toxicant-permeable balloons, which may actually fill up with the liquid toxican, a fact verified by microscopic examination, it is possible to employ impermeable microballoons to carry the excess toxicant, provided that they have surfaces which will adsorb sufficiently large quantities of said toxicant. Microballoons of this nature include those made of glass-like materials. Typical glass microspheres are those known as Corcel Carrier 46, provided by Interspace Corporation. These are cellular, siliceous glass spheres, chemically inert, with water absorption of 7 lbs./lb. and oil absorption of 4.5 lbs./lb. (Gardner-Coleman method). The surface area is about 2 sq. meters/gram.

The microballoons are characterized as being minute spheres, 10–60 microns in diameter, with wall thicknesses ranging from 0.5 to about 3 microns, and ranging about 0.100 to 0.150 g./cc. in bulk density.

When toxicant is taken up on these microballoons, generally by immersing the microballoons in liquid toxicant, the toxicant-carrying microballoons can be added to the elastomer very readily on a rubber mill or in an internal type mixer. Even though the amount of toxicant charged to the batch then greatly exceeds the amount which is soluble in the elastomer, the mixed composition is found to be essentially dry to the touch with no indication of excess liquid toxicant. The elastomer has dissolved the maximum amount of toxicant which it can dissolve. Further toxicant above this amount dissolved in the elastomer is held by the microballoons and is not visible as a liquid, oily moiety. The microballoons and excess toxicant are invisible to the naked eye, but can be observed under a microscope at 100× and higher magnifications. These compositions are found to be as easy to handle and to have as good storage stability as the compositions of the prior art which incorporate no more toxicant than will actually dissolve in the elastomer employed.

In this invention the presence of up to 100 parts of toxicant per 100 parts of elastomer when only 10 parts of said toxicant may actually be soluble in said elastomer gives biocidal compositions which can be handled with more safety in the field than can straight free toxicant and which provide from about 1 to about 90 parts essentially free toxicant per 100 parts elastomer available for quick kill. Generally from 10 to about 50 parts of toxicant per 100 parts elastomer in excess of the maximum amount of toxicant soluble in the given elastomer are preferred. This invention has value when the amount of toxicant added to the total composition exceeds that amount of toxicant that will actually dissolve in the given amount of elastomer. Tests have shown that from 20 weight percent to about 100 weight percent of microballoons based on the weight of toxicant, can be used in this fashion without undue loss of the elastomer physical properties or loss of control of the desired dissolved toxicant release rate. For example, even though bis(tri-n-butyl tin) oxide (TBTO) is soluble in neoprene rubber to the extent of only about 9 to 10 weight percent based on the raw rubber weight, use of these microballoons in the invention makes it possible to readily add up to 15 weight percent and more of TBTO in neoprene with little other changes in recipe and to obtain from the resulting compositions biocidal life measured in years plus immediate (less than 1 day) biocidal action against the particular species involved. The long term biocidal action is supplied by the elastomer-dissolved toxicant as disclosed in the prior art, Ser. No. 741,223 now Pat. 3,639,-583; the quick term action is supplied by the toxicant which is held in and on the microballoons. It is also possible that part of the excess toxicant, in addition to that consumed in quick kill, may go into solution in the elastomer to replace the first dissolved toxicant lost to the environment. This will increase the total effective life of the composition as well as supplying quick kill with maximum safety to those who handle the compositions.

Toxicant can be supplied to the composition in several manners. TBTO is soluble in neoprene to the extent of about 9.5 phr. If one desires to prepare a composition containing 15 phr. of TBTO, 9.5 parts TBTO can be mixed directly into the batch of neoprene plus compounding ingredients, and then 5.5 parts TBTO on microballoons can be added Alternatively, the entire 15 parts of TBTO can be taken up on microballoons and the combination added to the mixture of neoprene and compounding ingredients. In this case, it is found that 9.5 parts TBTO (up to the solubility limit) leaves the microballoons and dissolves in the neoprene; the balance of TBTO remains bound to the microballoons and is physically held in the rubber mass therewith. Further, in the alternative, but more time consuming, it has been found possible to add the toxicant and the microballoons separately, but not premixed, to the elastomer batch on the mill. In this case, the toxicant partially goes into solution in the elastomer and partially is taken up by the microballoons. Should 15 parts of TBTO be charged with 100 parts neoprene and other compounding ingredients, but no microballoons used as carriers for TBTO, the composition takes up 9.5 parts TBTO in the rubber, but the excess TBTO is observed as an oily substance, exuding from the sheet form of the biocidal composition and making it difficult to handle and store. When microballoons are present to hold the excess TBTO, the sheet composition is dry to the touch and can be stored in rolls or cut into chunks or particles of any desired size and stored indefinitely. The excess TBTO does not appear as an oily film or other bloom on the surface.

In the biocidal compositions of the invention, there may be utilized as the vulcanizable organic elastomer natural rubber, neoprene (polychloroprene) rubber; butyl (isobutylene/isoprene copolymer( rubber; SBR (styrene/butadiene rubbers); polybutadiene rubbers such as cis-polybutadiene rubber; synthetic polyisoprene rubbers such as cis-polyisoprene or synthetic natural rubber; nitriles rubbers (butadiene/acrylonitrile copolymers) and others. These elastomers are available on the market under a great variety of trade names. Resins and materials which vulcanize to a rigid, thermoset state are excluded from use in the invention. In the case of copolymeric materials, the molar or weight percent relationship of the components are not critical except when they contribute to forming a thermoset material as opposed to an elastic material when vulcanized.

The miscibility or solubility of the organic toxicants such as organo-tin compounds and titrosalicylanilide toxicants in the above (raw or uncompounded) rubbers is about as follows:

| Rubber | Toxicant | Solubility percent/wt.[1] |
|---|---|---|
| Neoprene | TBTO[2] | 9.5 |
| Do | "Baylusicide" [3] | +15 |
| Natural | TBTO | 11 |
| Do | "Bayluscide" g | 10 |
| SBR | TBTO | 7 |
| Nitrile [4] | TBTO | |
| 18% acrylo | TBTO | +15 |
| 22% acrylo | TBTO | 12 |
| 26% acrylo | TBTO | +8 |
| 33% acrylo | TBTO | +7 |

[1] Determined by a laboratory immersion.
[2] "TBTO" is bis(tributyl tin) oxide.
[3] "Bayluscide", a trademarked product of Farbenfabriken Bayer A.G., W. Germany, distributed by Chemagro Corp. of Kansas City, Mo., and said to be the 2-aminoethyl salt of 2′,5-dichloro-4′-nitrosalicyanilide.
[4] Butadiene/acrylonitrile copolymer rubbers of indicated combined "acrylo" (acrylonitrile) content.

The solubility of these toxicants in the rubbers is between about 7 percent to about 15 weight percent which is adequate to produce compositions with long term, low level biocidal activity. They will not, in most cases, provide for quick biocidal activity because the composition is formulated for slow release of the toxicant. All of the toxicant present is dissolved in the rubber. No free toxicant is available. This invention provides for the simultaneous presence of essentially free, that is, undissolved, toxicant which is available for immediate transfer to the environment in quantities great enough to achieve quick kill. The excess toxicant is also available to replenish dissolved toxicant as it leaves the elastomer and enters the environment and, possibly, to further extend the total biocidal life of the composition.

The biocidal compositions disclosed in Ser. No. 741,223 are prepared in conventional rubber mixing and processing equipment with care for adequate ventilation and against human dermal contact with the toxicants and other chemicals. The compositions include compounding ingredients such as reinforcing pigments, antioxidants, lubricants, accelerators, curatives and other ingredients used for quality rubber vulcanizates in accordance with the rubber compounder's art. The elastomer is mixed in the usual fashion with the other ingredients and the toxicant is preferably added to the mixing batch at the time for addition of similar non-toxic compounding ingredients, that is, dry toxicants are added with dry additives, liquid toxicants are added with oily lubricants. Mixing may be done on a two roll rubber mill or in a Banbury machine or other internal mixer. After mixing the composition is sheeted off to desired thickness. It may be discing chopped, sliced to strips or formed as tapes.

The biocidal compositions of this invention are formed as above but the amount of excess toxicant that is to be used is first combined with the microballoon carrier. This is accomplished by soaking the microballoons in liquid toxicant. If the toxicant is normally a dry powder, it can be melted and the microballoons soaked in the melted toxicant. Alternatively, a dry toxicant can be dissolved in an appropriate solvent and the resulting solution then taken up by the microballoons. In its liquid state the toxicant fills the voids in permeable microballoons and/or adsorbs on the surface thereof. The toxicant adsorbs on the surface of impermeable microballoons of glass. The combination of toxicant and microballoons has the appearance and consistency of a thick slurry and is preferably added to the total composition batch with part of the liquid or oily lubricating and/or extender oils that are included.

DETAILED DESCRIPTION OF THE INVENTION

Example 1

Phenolic microballoons are mixed in beakers with liquid TBTO for a period of 24 hours with no agitation. The liquid toxicant diffuses through the permeable walls of the microballoons, filling them, then in addition, it adsorbs on the surfaces of the microballoons. The combined materials are essentially dry in the proportions shwn yet pour smoothly from the beakers.

TABLE 1

| Material | Parts by weight of— A | B | C |
|---|---|---|---|
| Microballoons* | 30 | 40 | 50 |
| TBTO | 90 | 80 | 50 |
| Total parts | 120 | 120 | 100 |
| Parts TBTO in 20 parts of this mixture | 15 | 13.3 | 10 |

*Union Carbide Corporation "Microballoon" spheres BJO-0930, bulk density 0.105 g./cc. mx.

A biocidal composition is prepared according to recipe D below, the technique of mixing these materials is well known in the rubber compounding art.

The TBTO content is not greater than the known solubility of TBTO in the elastomer. Recipes E, F and G are similar to Recipe D, but contain higher loadings of TBTO than will dissolve in the elastomer. This is accomplished by first combining TBTO with microballoons as shown above. In preparing E, F, and G, 20 parts of the total parts of Recipes A, B, and C is added to batches E, F, and G, respectively.

TABLE 2

| Material | Parts by weight of— D | E | F | G |
|---|---|---|---|---|
| Neoprene | 100 | 100 | 100 | 100 |
| FEF carbon black | 14.5 | 14.5 | 14.5 | 14.5 |
| Magnesium oxide | 4 | 4 | 4 | 4 |
| Phenylbetanaphthylamine | 2 | 2 | 2 | 2 |
| Zinc oxide | 5 | 5 | 5 | 5 |
| Ethylene thiourea | 0.75 | 0.75 | 0.75 | 0.75 |
| Benzothiozyldisulfide | 1 | 1 | 1 | 1 |
| Lauric acid | 3 | 3 | 3 | 3 |
| Processing oil | 6.5 | 2.75 | 2.75 | 2.75 |
| TBTO | 6.5 | | | |
| TBTO taken up on microballoons: | | | | |
| TBTO | | 15 | 13.3 | 10.0 |
| Microballoons | | 5 | 6.7 | 10.0 |

After compounding, the compositions are sheeted off the mill in thicknesses of 0.075 inches and 0.125 inches and cured for 30 or 45 minutes at 300° F.

Strips, 6 inches x 6 inches are adhered with "Hydrolock" Cement, The B. F. Goodrich Company, Akron, Ohio, to stainless steel backing plates and submitted to immersion in barnacle infected waters at Miami, Fla. Each panel is removed from the water once a month for inspection and actual count of barnacles and bryozoans attached thereto. Every single one of the panels remains barnacle free for 48 months and the tests are still in progress. The samples incorporating excess TBTO are just as effective in long term life as the sample where all TBTO is dissolved in the elastomer, and they are expected to enjoy an even longer total effective life as some of the excess TBTO transfers from the microballoons and goes into solution in the elastomer.

Example II

A composition of Run E, Example I is sheeted to a thickness of 2 mm.

A circular disc 5 cm. in diameter with an area of 15 sq. cm. is cut from the sheet and placed on the bottom of a 200 ml. glass beaker which has an overflow near the top. Dechlorinated tap water is introduced at 50 ml./min. through an inlet tube over the surface of the rubber disc with water flow continuous day and night. It is assumed that the water picks up biocide which diffuses into the water and then contacts the test organisms.

Five mature snails (*Biomphalaria glabrata*) each 12–15 cm. diameter and 2 or 3 egg masses of the same species are placed in the container on a nylon screen mounted 2 mm. above the disc preventing the organisms from contacting the disc directly.

Snails and eggs are examined daily. Dead snails are removed. When all snails or all eggs are dead, a new group replaces them.

A second container, with no rubber disc, is used for a control. Control snails and eggs are examined daily and are replaced by fresh organisms whenever a fresh batch is placed in the test container. Water temperature ranges from 20° to 29.8° C. and pH is 7.5.

The time in days to kill all the snails or eggs is recorded. On average, two days are required to obtain complete mortality of eggs and three days for mature snails. In the initial test period, however, all eggs and mature snails are dead in one day, showing "quick kill" effectiveness of the composition. No mortality occurs among snails or eggs in the control during the entire test period.

Biocidal material, the 2-amino-ethyl salt of 2′,5′-dichloro-4-nitrosalicylanilide (Bayluscide) is incorporated with microballoons of carbon film, 40 microns in diameter, bulk density 0.135 g./cc. and with siliceous glass microspheres having a surface area of 2 sq. meters/gram in the proportions of 3 parts toxicant to 1 part microballoons, in each case forming a pourable, but dry appearing, slurry after standing for 24 hours.

Employing these slurries it is possible to incorporate 20 grams of Bayluscide into 100 grams of natural rubber where only 10 grams of the biocide is soluble in the rubber, and 35 grams of Bayluscide in 100 grams of neoprene where only 11 grams are soluble in the elastomer. The product compositions have good tensile strength in the form of thin sheets. They are dry in appearance and can be cut and chopped into small particles.

What is claimed is:

1. In a method of preparing a biocidal composition comprising dissolving from 0.02 to 20 parts by weight of bis(tri-n-butyl tin) oxide in a vulcanized matrix of 100 parts by weight of neoprene plus 4 to 100 parts by weight of carbon black per 100 parts of said neoprene, the proportion of said carbon black in the range given being selected to yield a desired rate of release of said bis(tri-n-butyl tin) oxide by said composition to the environment, wherein the maximum number of parts of said bis(tri-n- butyl tin) oxide is the number equal to the limit of the parts of said bis(tri-n-butyl tin) oxide soluble in the said 100 parts of neoprene, the improvement whereby from about 1 to about 90 parts by weight of said bis(tri-n-butyl tin)oxide in addition to the said number of parts of said bis(tri-n-butyl tin)oxide is combined in said composition, said improvement comprising the addition to said neoprene plus carbon black of a mixture of said 1 to 90 parts of said bis(tri-n-butyl tin)oxide in physical combination with microballoons said microballoons being characterized as minute spheres 10–60 microns in diameter, with wall thicknesses ranging from 0.1 to about 3 microns and bulk density of about 0.100 to 0.150 g./cc.

References Cited
UNITED STATES PATENTS

| | | | |
|---|---|---|---|
| 3,639,583 | 2/1972 | Cardarelli et al. | 424—125 |
| 3,426,473 | 2/1969 | Cardarelli et al. | 43—131 |
| 3,127,235 | 3/1964 | Benzel | 21—60.5 |
| 3,505,428 | 4/1970 | Kidwell et al. | 260—41.5 A |

VINCENT D. TURNER, Primary Examiner

U.S. Cl. X.R.

424—125, 288